No. 721,057. PATENTED FEB. 17, 1903.
A. F. LUCAS.
LUBRICATING EXPLOSIVE HYDROCARBON ENGINES.
APPLICATION FILED MAY 10, 1902.
NO MODEL.
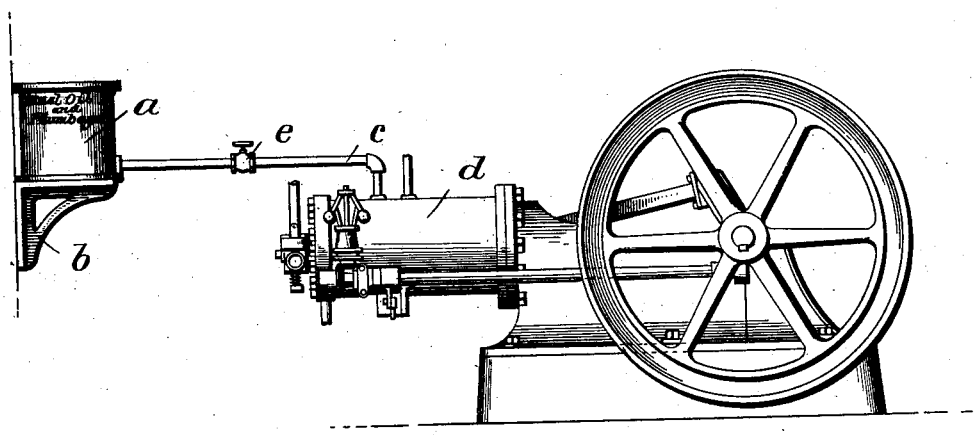
Witnesses
Geo. H. Pyne.
Fred W. Englert
Inventor
A. F. Lucas.
By Wilkinson & Fisher.
Attorneys

United States Patent Office.

ANTHONY F. LUCAS, OF WASHINGTON, DISTRICT OF COLUMBIA.

LUBRICATING EXPLOSIVE-HYDROCARBON ENGINES.

SPECIFICATION forming part of Letters Patent No. 721,057, dated February 17, 1903.

Application filed May 10, 1902. Serial No. 106,817. (No model.)

*To all whom it may concern:*

Be it known that I, ANTHONY F. LUCAS, a citizen of the United States, residing at Washington, in the District of Columbia, have invented certain new and useful Improvements in Lubricating Explosive-Hydrocarbon Engines; and I do hereby declare the following to be a full, clear, and exact description of the invention, such as will enable others skilled in the art to which it appertains to make and use the same.

My invention relates to improved methods for lubricating the cylinders of oil or gas engines or engines using hydrocarbons—such as powdered coal, oil, or distillates of oil—in which the fuel is exploded in said cylinder or other driving part of the engine. In such engines as are now ordinarily in use the oil or gas is exploded in the cylinder and mixed with more or less oxygen ordinarily derived from atmospheric air.

According to my invention I mix with the fuel so used a sufficient amount of finely-divided non-combustible unguent mineral—such as powdered graphite, powdered talc, or the like. If very finely divided, this mineral will remain in suspension in the oil for a long time, and in automobiles, launches, other vessels, cars, or kindred uses the vibration of the moving body might be sufficient to maintain the particles in suspension; but, if necessary, a positive stirring mechanism might be employed, such as an ordinary agitator well known in the various arts. In this way the lubricant is kept suspended through the mass of the oil and is not deposited as a sediment. When the latter is delivered to the cylinder, it carries along with it a portion of this mineral lubricant, which is deposited on the wearing-surface of the cylinder when the oil is exploded and is distributed around the cylinder by the movement of the piston or pistons. In this way the lubricant is automatically carried in with the oil and is left behind when the oil is consumed.

When the oil is converted into gas before being fed to the cylinder, particles of the mineral lubricant will be carried up with the gas formed from the oil and will be delivered to the cylinder where these particles are deposited when the gas is consumed.

In using the term "oil" I mean to be understood as including crude oil, refined oil, or any suitable distillate of oil which can be used in oil or gas engines of the character described.

While I have referred to graphite and talc for the purpose stated, I do not mean to confine the claim to any specific mineral lubricant, but any non-combustible lubricant which may be finely divided, suspended in, or carried along with the oil or gas would come within the scope of my invention.

In the accompanying drawing the figure shows an apparatus by which my invention may be carried into effect.

In the figure, $a$ represents a tank for holding the oil or other fuel, in which tank the finely-divided non-combustible unguent material is mixed with the oil either by hand or by a mechanical stirrer. This tank is supported on a bracket $b$, fixed to the wall if the engine is stationary or to any convenient part of the vehicle or vessel if the engine is designed for such use.

$c$ represents the pipe which connects the tank $a$ with the cylinder $d$ of the engine, which is shown as of a common type of explosive-engine. This pipe is provided with a regulating-valve $e$.

Having thus described my invention, what I claim, and desire to secure by Letters Patent of the United States, is—

The method of lubricating the cylinders of internal-combustion engines, which consists in mixing a finely-pulverized incombustible lubricant with the normal fuel-oil supply and supplying said mixture to the engine-cylinder.

In testimony whereof I affix my signature in presence of two witnesses.

ANTHONY F. LUCAS.

Witnesses:
   F. D. BLACKISTONE,
   CLARENCE A. BATEMAN.